United States Patent
Tameroglu

(10) Patent No.: US 10,646,801 B2
(45) Date of Patent: *May 12, 2020

(54) NOZZLE-BRUSH AUTOMATIC CLEANING FILTER WITH MOTOR REDUCER

(71) Applicant: ANTEL ARITMA TESISLERI INSAAT SANAYI VE TICARET ANONIM SIRKETI, Istanbul (TR)

(72) Inventor: Osman Oguz Tameroglu, Istanbul (TR)

(73) Assignee: ANTEL ARITMA TESISLERI INSAAT SANAYI VE TICARET ANONIM SIRKETI, Istanbul (TR)

( * ) Notice: Subject to any disclaimer, the term of this patent is extended or adjusted under 35 U.S.C. 154(b) by 0 days.

This patent is subject to a terminal disclaimer.

(21) Appl. No.: 14/915,800

(22) PCT Filed: Jul. 11, 2014

(86) PCT No.: PCT/TR2014/000266
§ 371 (c)(1),
(2) Date: Mar. 1, 2016

(87) PCT Pub. No.: WO2015/038079
PCT Pub. Date: Mar. 19, 2015

(65) Prior Publication Data
US 2016/0214039 A1    Jul. 28, 2016

(30) Foreign Application Priority Data
Sep. 12, 2013  (TR) .................. 2013/10727

(51) Int. Cl.
*C02F 1/00* (2006.01)
*B01D 29/35* (2006.01)
(Continued)

(52) U.S. Cl.
CPC ......... *B01D 29/6415* (2013.01); *B01D 29/35* (2013.01); *B01D 29/48* (2013.01);
(Continued)

(58) Field of Classification Search
None
See application file for complete search history.

(56) References Cited

U.S. PATENT DOCUMENTS

| 337,423 A | * | 3/1886 | Moore | B01D 24/10 210/796 |
| 431,448 A | * | 7/1890 | Dixon | B01D 29/33 210/355 |

(Continued)

FOREIGN PATENT DOCUMENTS

| CN | 202590470 U | 12/2012 |
| EP | 2325081 A2 | 5/2011 |

(Continued)

*Primary Examiner* — Robert J Popovics
(74) *Attorney, Agent, or Firm* — Nixon Peabody LLP

(57) ABSTRACT

The subject matter of the invention is a nozzle-brush automatic cleaning filtration device with motor reducer performing physical cleaning by trapping coarse particles and suspended solid contents in any liquids. These filters perform physical cleaning by trapping coarse particles and suspended solid contents in any liquids.

7 Claims, 3 Drawing Sheets

(51) Int. Cl.
  *B01D 29/48* (2006.01)
  *B01D 29/64* (2006.01)
  *C02F 103/00* (2006.01)

(52) U.S. Cl.
  CPC ......... *B01D 29/6446* (2013.01); *C02F 1/001* (2013.01); *C02F 2103/001* (2013.01); *C02F 2201/005* (2013.01); *C02F 2209/001* (2013.01); *C02F 2209/003* (2013.01); *C02F 2209/03* (2013.01); *C02F 2301/063* (2013.01); *C02F 2301/066* (2013.01); *C02F 2303/14* (2013.01); *C02F 2303/16* (2013.01); *C02F 2303/22* (2013.01); *C02F 2303/24* (2013.01)

(56) References Cited

U.S. PATENT DOCUMENTS

| | | | | | |
|---|---|---|---|---|---|
| 781,039 | A * | 1/1905 | Weabe | B01D 29/05 | 210/414 |
| 810,020 | A * | 1/1906 | Applegate | B01D 33/06 | 210/396 |
| 811,664 | A * | 2/1906 | Applegate | B01D 29/33 | 210/355 |
| 1,439,706 | A * | 12/1922 | Kneuper | B01D 37/02 | 516/136 |
| 1,510,863 | A * | 10/1924 | Rose | B01D 29/25 | 210/413 |
| 1,639,590 | A * | 8/1927 | Corkran | B01D 29/05 | 210/414 |
| 1,944,267 | A * | 1/1934 | Rathbun | B01D 46/0065 | 55/294 |
| 1,995,648 | A * | 3/1935 | Rathbun | B01D 46/0065 | 55/294 |
| 1,995,649 | A * | 3/1935 | Rathbun | B01D 46/0065 | 55/294 |
| 2,066,479 | A * | 1/1937 | MacIsaac | B01D 29/01 | 210/777 |
| 2,173,060 | A * | 9/1939 | Andrews | B01D 29/117 | 210/333.1 |
| 2,429,417 | A * | 10/1947 | Magill | B01D 29/48 | 210/333.1 |
| 2,606,663 | A * | 8/1952 | Blackman | B01D 29/356 | 210/303 |
| 2,652,153 | A * | 9/1953 | Ainslie | B01D 29/96 | 210/355 |
| 2,889,048 | A * | 6/1959 | Nordin | B01D 29/6446 | 210/409 |
| 2,961,952 | A * | 11/1960 | Doyle | B41F 23/002 | 101/416.1 |
| 2,978,108 | A * | 4/1961 | Strassheim | B01D 29/56 | 210/346 |
| 3,168,033 | A * | 2/1965 | Hansen | B30B 9/067 | 100/179 |
| 3,379,312 | A * | 4/1968 | Brown | B01D 29/60 | 210/415 |
| 3,445,002 | A * | 5/1969 | Muller | B01D 29/668 | 210/108 |
| 3,574,509 | A * | 4/1971 | Zentis | B01D 29/23 | 210/107 |
| 3,757,496 | A * | 9/1973 | Berg | B01D 46/0013 | 55/293 |
| 3,887,344 | A * | 6/1975 | Smith | B01D 46/0065 | 55/294 |
| 3,959,140 | A * | 5/1976 | Legras | B01D 29/25 | 210/107 |
| 3,994,810 | A * | 11/1976 | Schaeffer | B01D 29/232 | 210/103 |
| 3,997,441 | A * | 12/1976 | Pamplin, Jr. | B01D 29/25 | 210/777 |
| 4,154,588 | A * | 5/1979 | Herndon, Jr. | B01D 46/0065 | 55/283 |
| 4,156,651 | A * | 5/1979 | Mehoudar | B01D 29/23 | 210/108 |
| 4,284,500 | A * | 8/1981 | Keck | B01D 29/15 | 209/250 |
| 4,454,033 | A * | 6/1984 | Verduyn | B01D 24/4636 | 210/108 |
| 4,532,036 | A * | 7/1985 | Clifford | B01D 29/23 | 210/167.01 |
| 4,552,655 | A * | 11/1985 | Granot | B01D 29/114 | 210/108 |
| 4,624,785 | A * | 11/1986 | Drori | B01D 29/114 | 210/414 |
| 4,634,524 | A * | 1/1987 | Huber | B01D 33/648 | 210/158 |
| 4,692,247 | A * | 9/1987 | Orlans | B01D 29/117 | 210/314 |
| 4,818,402 | A * | 4/1989 | Steiner | B01D 29/23 | 210/411 |
| 4,859,335 | A * | 8/1989 | Whyte | B01D 29/114 | 210/393 |
| 4,898,671 | A * | 2/1990 | Fux | B01D 21/0012 | 210/333.01 |
| 4,906,357 | A * | 3/1990 | Drori | B01D 29/114 | 210/143 |
| 5,074,999 | A * | 12/1991 | Drori | B01D 29/114 | 210/143 |
| 5,085,771 | A * | 2/1992 | Huang | B01D 29/071 | 210/332 |
| 5,106,500 | A * | 4/1992 | Hembree | B01D 29/117 | 210/266 |
| 5,164,079 | A * | 11/1992 | Klein | B01D 29/117 | 210/186 |
| 5,183,568 | A * | 2/1993 | Lescovich | B01D 29/118 | 209/303 |
| 5,198,111 | A * | 3/1993 | Davis | B01D 29/118 | 210/408 |
| 5,228,993 | A * | 7/1993 | Drori | B01D 29/114 | 210/332 |
| 5,268,095 | A * | 12/1993 | Barzuza | B01D 29/01 | 210/143 |
| 5,364,539 | A * | 11/1994 | Castagno | B01D 29/05 | 210/768 |
| 5,401,396 | A * | 3/1995 | Lescovich | B01D 29/118 | 209/273 |
| 5,443,726 | A * | 8/1995 | Steiner | B01D 29/15 | 210/393 |
| 5,514,270 | A * | 5/1996 | Barzuza | B01D 29/15 | 210/356 |
| 5,527,462 | A * | 6/1996 | Davis | B01D 29/25 | 210/407 |
| 5,587,074 | A * | 12/1996 | Lynch | B01D 29/23 | 210/411 |
| 5,595,655 | A * | 1/1997 | Steiner | B01D 29/15 | 210/391 |
| 5,632,903 | A * | 5/1997 | Caracciolo, Jr. | B01D 29/117 | 210/333.01 |
| 5,733,464 | A * | 3/1998 | Bunch | B01D 29/684 | 210/791 |
| 5,804,072 | A * | 9/1998 | Yang | B01D 29/117 | 210/411 |
| 5,824,229 | A * | 10/1998 | Larkey | B01D 29/117 | 210/108 |
| 5,855,794 | A * | 1/1999 | Caracciolo, Jr. | B01D 29/117 | 210/107 |
| 5,855,799 | A * | 1/1999 | Herrmann | B01D 17/045 | 210/780 |
| 5,863,443 | A * | 1/1999 | Mainwaring | B01D 21/0012 | 210/800 |
| 5,871,652 | A * | 2/1999 | England | B01D 29/33 | 210/106 |
| 6,001,242 | A * | 12/1999 | England | B01D 29/33 | 210/106 |
| 6,187,177 | B1 * | 2/2001 | Ogburn | B01D 29/15 | 210/393 |
| 6,267,879 | B1 * | 7/2001 | Gil | B01D 29/114 | 210/107 |
| 6,337,013 | B1 * | 1/2002 | Koopmans | B01D 29/23 | 210/232 |

(56) References Cited

U.S. PATENT DOCUMENTS

| | | | |
|---|---|---|---|
| 6,475,397 B1* | 11/2002 | Sanderson | B01D 29/665 210/791 |
| 6,808,076 B2* | 10/2004 | Villares Lenz Cesar | B01D 33/067 210/391 |
| 6,959,818 B2* | 11/2005 | Olson | B01D 29/117 210/411 |
| 7,055,699 B2* | 6/2006 | Takatsuka | B01D 29/15 210/107 |
| 7,077,957 B2* | 7/2006 | Posselt | B01D 29/118 210/304 |
| 7,083,735 B2* | 8/2006 | Laing | B01D 29/114 210/791 |
| 7,097,046 B2* | 8/2006 | Calabrese | B01D 29/01 210/123 |
| 8,028,841 B2* | 10/2011 | Olson | B01D 29/117 210/411 |
| 8,501,004 B2* | 8/2013 | Lee | B63J 4/002 210/106 |
| 8,524,075 B1* | 9/2013 | Quintel | B01D 29/232 210/108 |
| 8,678,199 B2* | 3/2014 | Keller | B01D 29/15 210/170.09 |
| 8,821,720 B2* | 9/2014 | Lee | B01D 29/117 210/107 |
| 9,211,489 B2* | 12/2015 | Riggers | B01D 29/6476 |
| 9,327,218 B2* | 5/2016 | Linster | B01D 29/52 |
| 9,415,332 B2* | 8/2016 | Shaw | B01D 29/64 |
| 9,545,588 B2* | 1/2017 | Lee | B01D 29/117 |
| 9,550,557 B2* | 1/2017 | Lee | B01D 29/684 |
| 9,561,454 B2* | 2/2017 | Browning | B01D 29/035 |
| 9,616,363 B2* | 4/2017 | Osman Oguz | B01D 29/58 |
| 9,816,282 B2* | 11/2017 | Chick | E04H 4/1245 |
| 9,901,850 B2* | 2/2018 | Zur | B01D 29/117 |
| 10,245,531 B2* | 4/2019 | Steiner | B01D 29/23 |
| 10,286,339 B2* | 5/2019 | Crandall | B01D 29/6415 |
| 2002/0008068 A1* | 1/2002 | Anderson | B01D 29/15 210/741 |
| 2004/0112825 A1* | 6/2004 | Villares Lenz Cesar | B01D 33/067 210/391 |
| 2004/0238435 A1* | 12/2004 | Olson | B01D 29/117 210/413 |
| 2006/0043014 A1* | 3/2006 | Takatsuka | B01D 29/15 210/411 |
| 2007/0199885 A1* | 8/2007 | Shmuel | B01D 29/114 210/427 |
| 2008/0047885 A1* | 2/2008 | Shiekelmacher | B01D 29/23 210/107 |
| 2008/0272058 A1* | 11/2008 | Olson | B01D 29/117 210/741 |
| 2009/0050582 A1* | 2/2009 | Gil | B01D 29/114 210/798 |
| 2011/0100885 A1* | 5/2011 | Lee | B63J 4/002 210/85 |
| 2011/0303591 A1* | 12/2011 | Lee | B01D 29/117 210/106 |
| 2012/0223028 A1* | 9/2012 | Dagan | B08B 5/04 210/791 |
| 2013/0026111 A1* | 1/2013 | Gil | B01D 29/114 210/791 |
| 2013/0087495 A1* | 4/2013 | Riggers | B01D 29/6476 210/415 |
| 2013/0270163 A1* | 10/2013 | Zur | B01D 29/117 210/138 |
| 2014/0021125 A1* | 1/2014 | Luo | B01D 29/33 210/332 |
| 2014/0238911 A1* | 8/2014 | Lee | B01D 29/682 210/108 |
| 2014/0366493 A1* | 12/2014 | Takahashi | B01D 46/0065 55/302 |
| 2016/0214039 A1* | 7/2016 | Tameroglu | C02F 1/001 |
| 2017/0014736 A1* | 1/2017 | Osman Oguz | B01D 29/58 |
| 2017/0136391 A1* | 5/2017 | Crandall | B01D 29/6415 |
| 2019/0193126 A1* | 6/2019 | Dagan | B08B 5/04 |

FOREIGN PATENT DOCUMENTS

| | | |
|---|---|---|
| KR | 20130063563 A | 6/2013 |
| WO | 2007/038894 A1 | 4/2007 |

* cited by examiner

NOZZLE-BRUSH AUTOMATIC CLEANING FILTER WITH MOTOR REDUCER

CROSS-REFERENCE TO RELATED APPLICATIONS

This application is a 35 U.S.C. § 371 National Phase Entry Application of International Application No. PCT/TR2014/000266 filed Jul. 11, 2014, which designated the U.S., and which claims priority to TR Application No. 2013/10727 filed Sep. 12, 2013, the contents of each of which are incorporated herein by reference in their entireties.

The subject matter of the invention is a liquid filtration device being a "Nozzle-Brush Automatic Cleaning Filter with Motor Reducer". These filters perform physical cleaning by trapping coarse particles and suspended solid contents in any liquid. Its housing material and some internal equipment can be manufactured from metal or plastic based materials (stainless steel, carbon steel, PVC, etc.). Its body has a cylindrical structure. The filter's inlet and outlet pipes have been designed as to have flange connections. The filter can be connected directly to pressurized pipelines by means of these flanges. Due to this feature, it does not require special support and space. It can be mounted in pressurized pipelines having minimum 1 bar and maximum 25 bar.

As it is known, surface waters are intensely used worldwide for quite various purposes. Such areas of usage are irrigation systems, potable and tap water purposes and cooling water. However, surface waters contain also fine particles besides many macro-particles. Such water types require both coarse and fine filtration.

It is impossible to perform both coarse and fine particle filtration by means of the existing automatic cleaning systems. This invention aims to provide the solution for this problem.

In some cases, existing cleaning systems' screens cannot be cleaned thoroughly due to the type of pollutants and/or the water pressure. In such a case, the dirt building up and not cleaned from the internal surface of the filter screen is fully removed by this invention having adjustable revolutions with motor reducer combining brush and nozzles device being the subject matter of the invention.

The water to be filtered has a minimum pressure of 1 bar (usually being 0.5 bars), its flow rate (m$^3$/s) is very high, and includes pollutants as tree branches, leaves, fishes, frogs, moss, waste, sand, silt, algae as well as suspended solids and fine particles depending on the environment.

In order to filter such waters a type of filter structure providing the features below is required:

Filter element able to allow high flow rates,
Manufacture with different filtration levels,
Create very low head loss,
Capable to trap both coarse and fine particles easily,
Structure ensuring removal of trapped particles automatically,
Perfectly circular surface to ease automatic cleaning of the combined brush and nozzles device to be installed,
Provide a resistance ensuring that the device will not be deformed when subjected to ΔP load in addition to the pressure and the high flow rate.

Both coarse and fine particles accumulating on the internal surface of the filter screen (8) are discharged through the drainage lines (16 and 17) located on the console group (11) while the automatic cleaning process is taking place. Generally, valves are connected to such drainage lines (16 and 17) and when these valves are opened to the atmosphere, a strong hydraulic current is created towards the drainage outlet. The cleaning process of such filter types consist of two stages:

1$^{st}$ Stage (Brush Cleaning): If a differential pressure (ΔP) between the inlet pipeline (14) and the outlet pipeline (15) is detected, the motor (9) actuates the combined brush and nozzles device (12). Thereby, this device performs a vertical and linear displacement creating a helical movement. During this helical movement brushes remove the dirt built up on the internal surface of the filter screen. Afterwards, the exhaust valve on the drainage line (16) opens to atmosphere creating a strong hydraulic current discharging the dirt out of the filter. However, this brush cleaning is only a coarse cleaning process.

2$^{nd}$ Stage (Nozzle Cleaning): The fine cleaning process is performed at 2$^{nd}$ stage, after the coarse cleaning done by brush at the 1$^{st}$ stage. The exhaust valve on the drainage line (16) used for the brush cleaning process is closed and the exhaust valve on the drainage line (17) for the nozzle cleaning process is opened. The opening of this exhaust valve creates a vacuum effect at the internal of the nozzles. Meanwhile, the motor continues to execute the helical movement of the combined brush and nozzles device (12). This helical movement allows the nozzles to remove the accumulated fine particles from the internal surface of the screen by means of the vacuum suction. The dirt sucked by the nozzles is discharged from the filter through the drainage line (17). During these stages, the filtration process is not interrupted.

By this means, the filter can be cleaned by simply opening and closing the valves without the necessity of any manual disassembling and reassembling. The full automatic performance of the filter is ensured by the electrically controlled drainage valves, which open and close according to the signals received from the ΔP sensors placed at the inlet and outlet of the filter. As the system is fully automatic, the opening and closing of the actuator valves is realized by means of signals from a time relay or a ΔP sensor measuring the pollution level. Depending on the site conditions, combinations based both on time and ΔP can be generated.

As a summary, this filter will be manufactured as an easily assembling device having a robust structure including a perfectly circular stainless steel screen, motor (9) reducer (10) with various power ratios for the combined brush and nozzles device (12) produced from metal and/or plastic materials as well as the cylindrical housing (13). Consequently, this filter will offer simple and fast solutions for large sort of requirements thanks to all these high performance features.

REFERENCE NUMBERS

Figure 1:
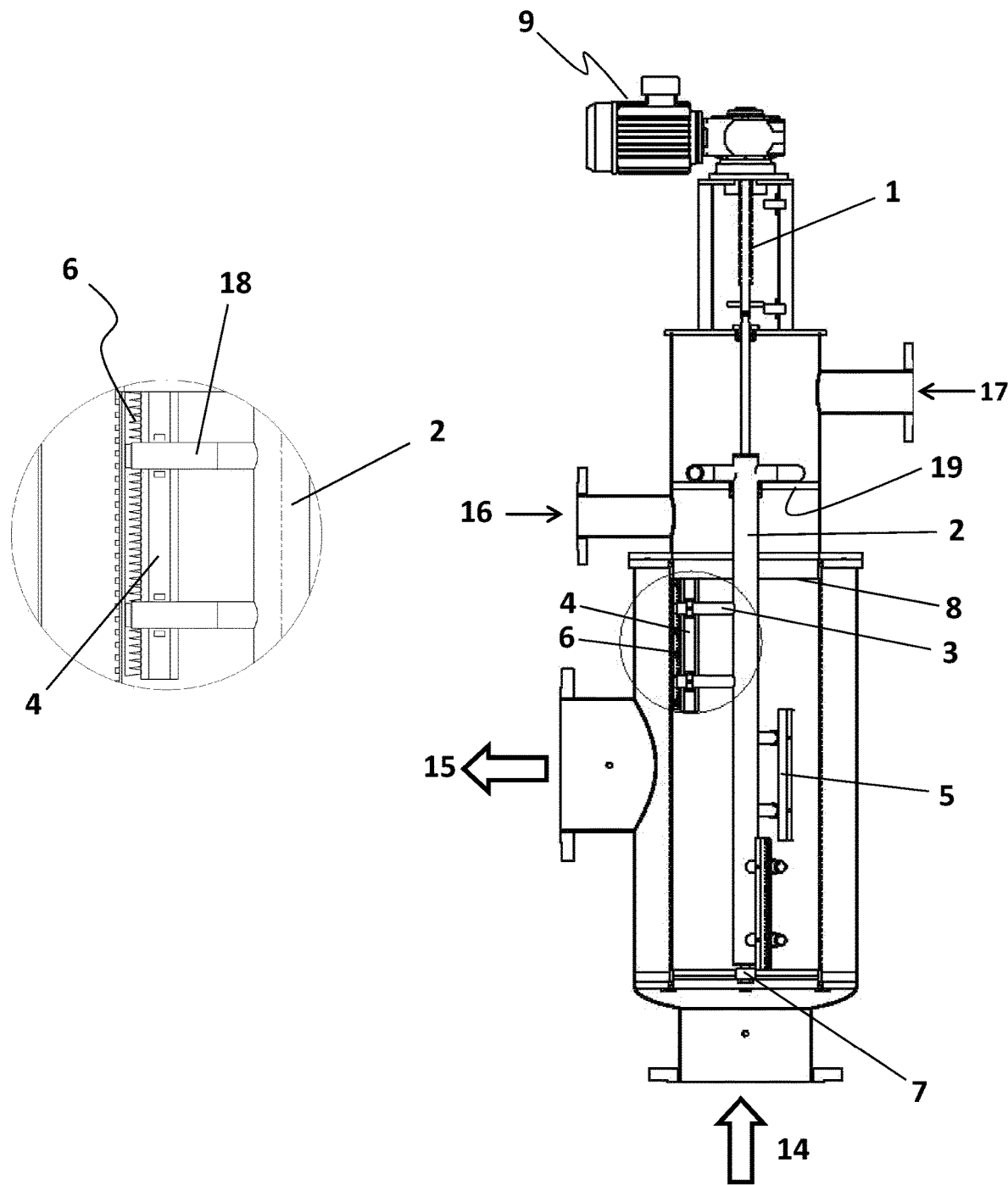
FIG. 1 Sectional view of the mounted filter
FIG. 2 Filter housing
FIG. 3 Filter screen
FIG. 4 Combined Nozzle and Brush device
FIG. 5 Console group with motor reducer
Figure 2:
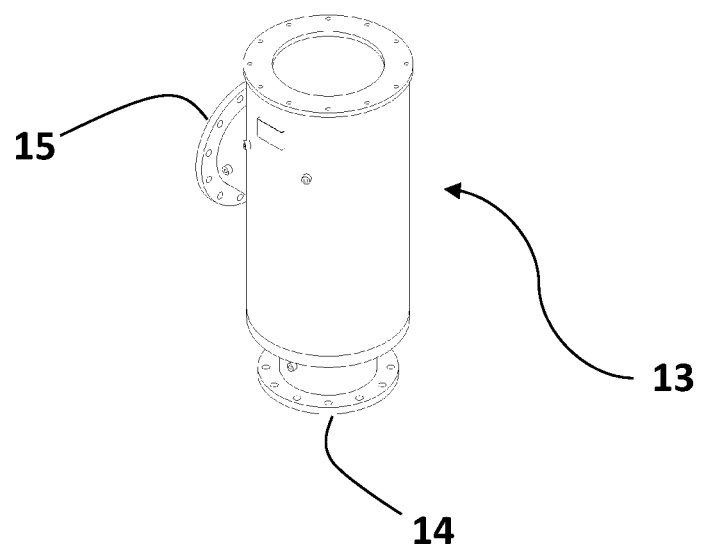
Figure 3:
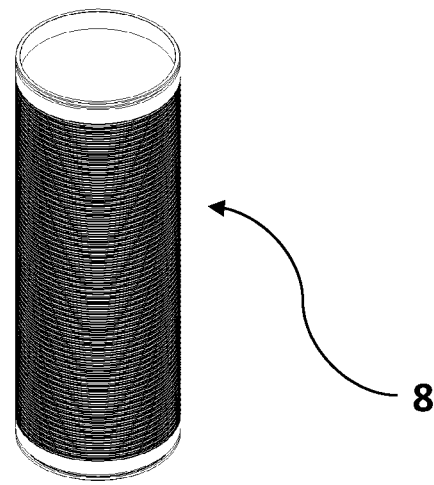
Figure 4:
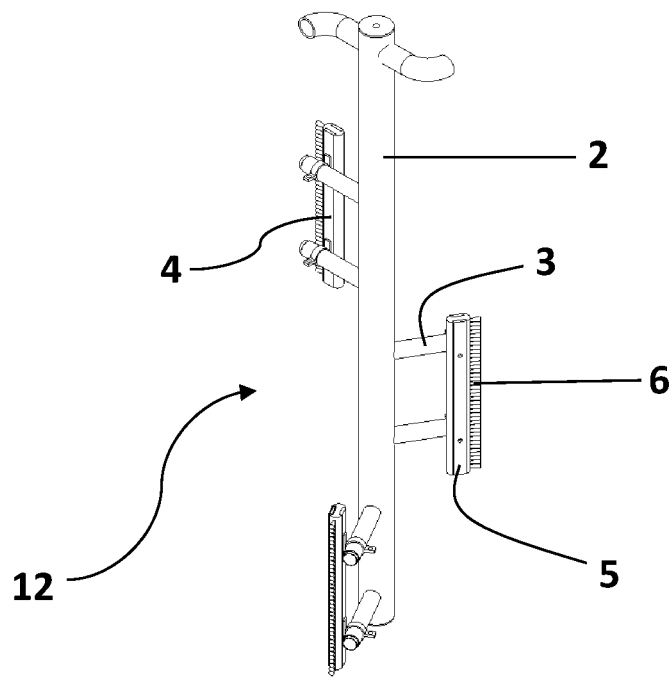
Figure 5:
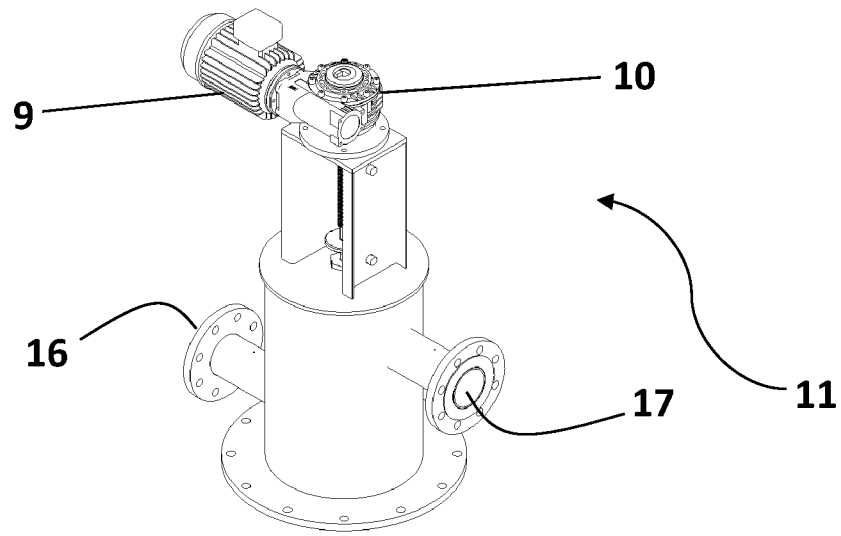

1. Reducer Shaft
2. Collector Pipe
3. Collector Nozzle
4. Brush Fixing Plate
5. Brush Holder
6. Brush
7. Collector Bearing 8. Filter Screen
9. Motor
10. Reducer
11. Console Group with Motor Reducer
12. Combined Nozzle and Brush Device
13. Filter Housing
14. Inlet Pipeline
15. Outlet Pipeline
16. Drainage Line (for brush cleaning)
17. Drainage Line (for nozzle cleaning)
18. Nozzle
19. Wall Working Principle of the Invention The liquid to be filtered enters to the filter through the inlet pipeline (14). The cylindrical filter screen (8) placed inside the filter performs the filtration of this liquid entering to the filter. The liquid passing through the filter screen (8) gets out via the outlet pipeline (15) and continues its way as a filtered liquid. As this liquid flows through, the filter screen (8) traps the fine and coarse particles inside the liquid described above. Hence, clogging will occur on the internal surface of the filter screen (8) according to the amount of dirtiness in it. Such clogging causes a ΔP value between the inlet and the outlet. Additional different equipment capable to detect the ΔP value is available and can be mounted on the sleeves located on the filter body. According to the design of the filter station and the customer requirements, ΔP or pressure transmitter serves for this purposes. This equipment detecting ΔP sends signals to the motor (9) when the ΔP between the inlet and the outlet has reached a preset value and triggers the cleaning mechanism's operation. Such cleaning process is performed at two stages, namely, brush cleaning and nozzle cleaning.

At the 1$^{st}$ stage, the brush cleaning mode, the motor (9) starts to rotate the reducer shaft (1). At the same time, the drainage outlet (16) for the brush cleaning process is opened. The collector pipe (2) realizes both its cyclical rotation movement and its linear progressing movement and thus performs a helical displacement provided by the motor (9) to the reducer shaft (1). Owing to such helical movement, the brushes sweep off the dirt accumulated on the internal surface of the screen. The coarse dirt removed from the internal surface of the screen by the brushes is discharged from the filter due to the impact of a strong current created by opening the exhaust valve at the drainage outlet (16) open to the atmosphere.

At the 2$^{nd}$ stage, fine particles not being removed from the internal surface of the screen by the brushes, will be completely removed during the nozzle cleaning process. The nozzle cleaning process starts after the ΔP has been dropped to some level by the brush cleaning. The combined nozzle and brush back-flush device (12) performs its helical movement while the nozzles are scanning and cleaning the whole screen surface. Meanwhile, the exhaust valve at the drainage outlet (16) for the brush cleaning process is closed and the second exhaust valve at the drainage outlet (17) for the nozzle cleaning process is opened. Afterwards, the dirt passes through the nozzles (3) sucked from the internal surface of the screen through the collector pipe (2) and thus allows the dirt to be discharged from the filter through the second exhaust drainage outlet (17) open to the atmosphere.

When the cleaning procedure is completed, the ΔP between the filter inlet and outlet drops back to its initial value, a signal is sent to the motor and to the exhaust valve (17) to be closed automatically. The system continuous to perform its ordinary operations (filtration).

During these stages execution, the filtration process is not interrupted.

Structure of the Invention

Basically, the invention consists of four major groups:
1. Filter Housing (13)
2. Filter Screen (8)
3. Combined Nozzle and Brush Device (12)
4. Console Group with Motor Reducer (11)

Filter Housing

The filter housing (13) is a structure manufactured either from metal or plastic based materials (stainless steel, carbon steel, etc.) having a fully cylindrical shape, being its inlet and outlet connections are flanged and equipped with sleeves for extra equipment to be connected.

The filter housing (13) consists of a main pipe including inlet and outlet pipes welded to it. The inlet and outlet pipes are flanged and therefore can be easily mounted to pressurized or non-pressurized pipelines. A flange fixing the console group (11) with motor reducer is located on the upper part of the body.

The filter housing (13) is designed to resist to a pressure of 10 bars or 16 bars, depending on the specific requirement. Also, the device can be manufactured to suit temperatures of 60° C. or 90° C.

Filter Screen

The filter screen (8) is a structure performing the filtration function, manufactured from stainless steel, having a full cylindrical form and capable to offer various filtration ratios.

The diameter and height of the filter screen is specified as to provide the filtration surface, which is calculated on the basis of the filter inlet and outlet diameters and the flow rate quantity. Afterwards, the manufactured screen (8) is placed into the filter housing (13).

Combined Nozzle and Brush Back-Flush Device

The combined nozzle and brush back-flush device (12) is a group consisting of several parts as a stainless steel collector pipe (2), stainless steel collector nozzles (3), stainless steel brush fixing plates (4), and brushes (6) manufactured from metal or plastic based materials, and brush holders (5) and nozzles (18). Upon placing the filter screen (8) into the filter housing (13), this device is mounted into the screen and thus it is centered with the collector bearing (7). It has the functionality to remove the dirt from internal surface of the filter screen (8) by rotating (cyclical and linear movement) due to the actuation of the motor.

Console Group with Motor Reducer

The console group (11) with motor reducer is a console consisting of several parts as a motor (9)—reducer (10) providing the rotation to the combined nozzle and brush back-flush device (12), housing connection flanges, drainage pipes, flanged parts and other parts. Upon placing the internal parts into the filter housing (13), this console group (11) with motor reducer is placed onto the housing and connected to it.

The invention claimed is:

1. A filtration device comprising:
    a filter housing including a filter screen, an inlet pipeline through which a liquid to be filtered enters into an inner volume of the filter screen, and an outlet pipeline through which the liquid passing through the filter screen exits the filter screen;
    a combined nozzle and brush back-flush device including collector nozzles and brushes, the brushes operable to sweep off coarse dirt from an internal surface of the filter screen and a collector pipe through which a vacuum is created on the collector nozzles for implementing a fine cleaning process; and a console group including a motor reducer and motor operable to rotate the combined nozzle and brush back-flush device thereby removing dirt from an internal surface of the filter screen by way of rotation provided by actuation of the motor, said console group further including exhaust valves fluidically connected to corresponding first and second drainage lines, wherein the first drainage line is fluidically connected to the inner volume of the filter screen to allow removal of coarse particles by opening the exhaust valve in the console group fluidically connected to the first drainage line, and wherein the second drainage line is fluidically separated from the first drainage line by a wall within an interior chamber of the console group, the second drainage line fluidically connected to the collector pipe of the combined nozzle and brush back-flush device to allow removal of fine particles by opening the exhaust valve in the console group fluidically connected to the second drainage line.

2. The filtration device according to claim 1 wherein said filter housing has a cylindrical structure made of a metal or plastic material.

3. The filtration device according to claim 1 wherein said combined nozzle and brush back-flush device further comprises brush fixing plates and brush holders.

4. A filtration device comprising:

a filter housing including a cylindrical filter screen, an inlet pipeline through which a liquid to be filtered enters into an inner volume of the cylindrical filter screen, and an outlet pipeline through which the liquid passing through the cylindrical filter screen exits the cylindrical filter screen;

a combined nozzle and brush back-flush device including collector nozzles and brushes configured to be placed within the filter screen, the brushes operable to sweep off coarse dirt from an internal surface of the cylindrical filter screen and a collector pipe through which a vacuum is created on the collector nozzles for implementing a fine cleaning process; and a console group including a motor reducer and motor operable to rotate the combined nozzle and brush back-flush device thereby removing dirt from an internal surface of the cylindrical filter screen by way of rotation provided by actuation of the motor, the console group further including exhaust valves fluidically connected to corresponding first and second drainage lines, wherein the first drainage line is fluidically connected to the inner volume of the cylindrical filter screen to allow removal of coarse particles by opening the exhaust valve in the console group fluidically connected to the first drainage line, and wherein the second drainage line is fluidically separated from the first drainage line by a wall within an interior chamber of the console group, the second drainage line fluidically connected to the collector pipe of the combined nozzle and brush back-flush device to allow removal of fine particles by opening of the exhaust valve in the console group fluidically connected to the second drainage line.

5. The filtration device according to claim 4, wherein the cylindrical filter screen is a fully cylindrical structure made of stainless steel.

6. The filtration device according to claim 4, wherein the combined nozzle and brush back-flush device is centered within the cylindrical filter screen with a collector bearing.

7. The filtration device according to claim 4, wherein the combined nozzle and brush back-flush device further comprises brush fixing plates and brush holders.

* * * * *